United States Patent
Modrzejewski et al.

(10) Patent No.: US 9,193,454 B2
(45) Date of Patent: Nov. 24, 2015

(54) SYSTEM AND METHOD FOR PROVIDING FOR COLLECTIVE CONTROL IN AN AIRCRAFT

(71) Applicants: Brian S. Modrzejewski, Keller, TX (US); Gary D. Hall, Grand Prairie, TX (US); John R. McCullough, Weatherford, TX (US); Farid Saiyed, Colleyville, TX (US); Glenn A. Shimek, Kennedale, TX (US); Danny A. Spivey, Fort Worth, TX (US); Tim Stark, Arlington, TX (US); Brian S. Vollmer, Grapevine, TX (US)

(72) Inventors: Brian S. Modrzejewski, Keller, TX (US); Gary D. Hall, Grand Prairie, TX (US); John R. McCullough, Weatherford, TX (US); Farid Saiyed, Colleyville, TX (US); Glenn A. Shimek, Kennedale, TX (US); Danny A. Spivey, Fort Worth, TX (US); Tim Stark, Arlington, TX (US); Brian S. Vollmer, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 212 days.

(21) Appl. No.: 13/659,547

(22) Filed: Oct. 24, 2012

(65) Prior Publication Data

US 2014/0110525 A1  Apr. 24, 2014

(51) Int. Cl.
*B64C 9/00* (2006.01)
*B64C 27/605* (2006.01)

(52) U.S. Cl.
CPC ......... *B64C 27/605* (2013.01); *Y10T 29/49826* (2015.01)

(58) Field of Classification Search
USPC ........... 244/99.2, 17.11, 17.25, 7 R; 416/147, 416/164, 168 A
See application file for complete search history.

(56) References Cited

U.S. PATENT DOCUMENTS

| | | | | |
|---|---|---|---|---|
| 1,946,614 | A | | 2/1934 | Darr |
| 3,912,199 | A | * | 10/1975 | Seibel et al. ............... 244/17.11 |
| 3,972,491 | A | * | 8/1976 | Ferris et al. ............... 244/17.27 |
| 4,137,010 | A | * | 1/1979 | Stroub ............................ 416/51 |
| 4,232,563 | A | * | 11/1980 | Peterson et al. ................. 74/470 |
| 5,199,849 | A | * | 4/1993 | Leman ........................... 416/114 |
| 5,460,487 | A | * | 10/1995 | Schmaling et al. ........ 416/134 A |
| 5,810,562 | A | * | 9/1998 | Byrnes et al. ................. 416/114 |
| 6,074,168 | A | * | 6/2000 | Rampal et al. ................ 416/114 |
| 6,149,386 | A | * | 11/2000 | Rampal ......................... 416/114 |
| 6,152,696 | A | | 11/2000 | Rampal ......................... 416/114 |
| 6,296,444 | B1 | * | 10/2001 | Schellhase et al. ....... 416/134 A |
| 6,439,849 | B1 | | 8/2002 | Sehgal et al. ................. 416/134 |

(Continued)

FOREIGN PATENT DOCUMENTS

| | | | | |
|---|---|---|---|---|
| DE | 202007014395 | | 12/2007 | ............ B64C 27/605 |
| EP | 0457646 | A1 | 11/1991 | ............ B64C 27/605 |
| FR | 958 830 | A | 3/1950 | ............................ 6/4 |

OTHER PUBLICATIONS

"Rotary Wing Flight Training," Helicopter Controls and Components, http://www.pilotfriend.com/traning/flight_training/rotary/helis.htm (8 pages), Downloaded Jun. 17, 2012.

(Continued)

*Primary Examiner* — Medhat Badawi
(74) *Attorney, Agent, or Firm* — Baker Botts L.L.P.

(57) ABSTRACT

In accordance with one embodiment of the present disclosure, a trunnion includes a first portion and a second portion. The first portion is capable of coupling directly to a drive tube of an aircraft, wherein the drive tube is capable of rotating around a first axis. The second portion is capable of coupling to a swash plate of the aircraft, wherein the swash plate is capable of causing the pitch of at least one of a plurality of aircraft blades to change.

16 Claims, 5 Drawing Sheets

(56) References Cited

U.S. PATENT DOCUMENTS

| | | | |
|---|---|---|---|
| 6,695,583 B2* | 2/2004 | Schmaling et al. | 416/107 |
| 6,892,980 B2* | 5/2005 | Kawai | 244/12.4 |
| 7,008,310 B2* | 3/2006 | Andres | 451/398 |
| 7,524,169 B2* | 4/2009 | Podgurski | 416/168 R |
| 8,050,612 B2* | 11/2011 | Kinouchi et al. | 399/333 |
| 8,142,158 B2* | 3/2012 | Schmaling et al. | 416/149 |
| 8,470,452 B2* | 6/2013 | Chaney et al. | 428/640 |
| 8,568,827 B2* | 10/2013 | Liu et al. | 427/249.7 |
| 8,739,612 B2* | 6/2014 | Kawano et al. | 73/112.01 |
| 2013/0105636 A1* | 5/2013 | Day et al. | 244/7 A |
| 2014/0110525 A1* | 4/2014 | Modrzejewski et al. | 244/99.2 |

OTHER PUBLICATIONS

European Patent Office Communication dated Mar. 13, 2013, regarding Application No. 12198607.9-1754.

Canadian Intellectual Property Office, Application No. 2,831,319, Examiner's Requisition, 3 pages, Dated: Feb. 17, 2015.

European Patent Office, Application No. 12198607.9-1754, Communication pursuant to Article 94(3) EPC, 7 pages, Dated: Oct. 3, 2015.

* cited by examiner

SYSTEM AND METHOD FOR PROVIDING FOR COLLECTIVE CONTROL IN AN AIRCRAFT

GOVERNMENT RIGHTS

This invention was made with Government support from the Naval Air Systems Command (NAVAIR), Contract No. PCA 901P0776, Work Order VS77. The government may have certain rights in this invention.

TECHNICAL FIELD

This disclosure relates in general to aircraft and more particularly to a system and method for providing collective control in an aircraft.

BACKGROUND

Traditionally, the vertical flight of an aircraft (such as a helicopter) has been controlled using a trunnion that provides for collective control in the aircraft. For example, the trunnion may slide up and down a helicopter's drive tube so that the angle of each of the helicopter rotor blades may be changed simultaneously. This may increase or decrease the lift provided to the helicopter, thereby increasing or decreasing the altitude of the helicopter. These prior art trunnion systems, however, have disadvantageous which may be addressed in this disclosure.

SUMMARY OF THE DISCLOSURE

In accordance with one embodiment of the present disclosure, a trunnion includes a first portion and a second portion. The first portion is capable of coupling directly to a drive tube of an aircraft, wherein the drive tube is capable of rotating around a first axis. The second portion is capable of coupling to a swash plate of the aircraft, wherein the swash plate is capable of causing the pitch of at least one of a plurality of aircraft blades to change.

Numerous technical advantages are provided according to various embodiments of the present disclosure. Particular embodiments of the disclosure may exhibit none, some, or all of the following advantages depending on the implementation. In particular embodiments, the first portion of the trunnion may connect directly to the drive tube of the aircraft. This may reduce the number of parts needed to provide collective control for the aircraft, thereby reducing cost. In particular embodiments, the trunnion may be used interchangeably with a drive tube positioned on the right side of the aircraft or with a drive tube positioned on the left side of the aircraft. As such, two different parts may not be needed for the aircraft. In particular embodiments, the trunnion and drive tube may include a coating that allows the trunnion and/or drive tube to be visually inspected for wear and/or tear. This may allow a user to determine whether or not the trunnion and/or drive tube should be replaced without disassembling the trunnion configuration.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Embodiments of the present disclosure and their advantages are best understood by referring to FIGS. 1 through 4C of the drawings, like numerals being used for like and corresponding parts of the various drawings.

Figure 1:
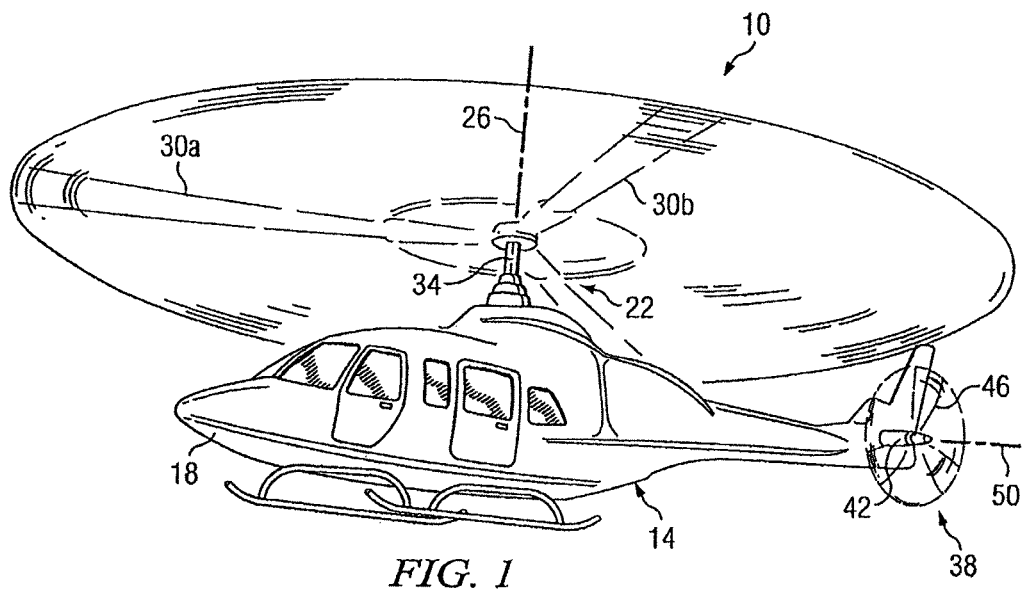
FIG. 1 illustrates one embodiment of a system that includes one or more trunnions that provide for collective control.

FIG. 1 illustrates one embodiment of a system 10 that includes one or more trunnions that provide for collective control. According to the illustrated embodiment, system 10 is a helicopter 14. Helicopter 14 may include a fuselage 18 and a main rotor assembly 22, including main rotor blades 30 and a main rotor shaft 34. Main rotor blades 30 generally rotate about a longitudinal axis 26 of main rotor shaft 34. Helicopter 14 may further include a tail rotor assembly 38, including tail rotor blades 46 and a tail rotor shaft 42. Tail rotor blades 46 generally rotate about a longitudinal axis 50 of tail rotor shaft 42. In particular embodiments, the direction of flight of helicopter 14 may be controlled based on cyclic control input and collective control input. Cyclic control may refer to the ability to change the pitch of a rotor blade individually as the rotor blade rotates. Such cyclic control allows helicopter 14 to move forward, backward, left, right, or any combination of the preceding. Collective control may refer to the ability to change the pitch of all of the rotor blades simultaneously. Such collective control may increase or decrease the lift provided to helicopter 14, causing it to gain or lose altitude. In particular embodiments, helicopter 14 may include one or more trunnions that slide up and down a drive tube (not shown) of helicopter 14 to provide for collective control of helicopter 14.

Figure 2A:
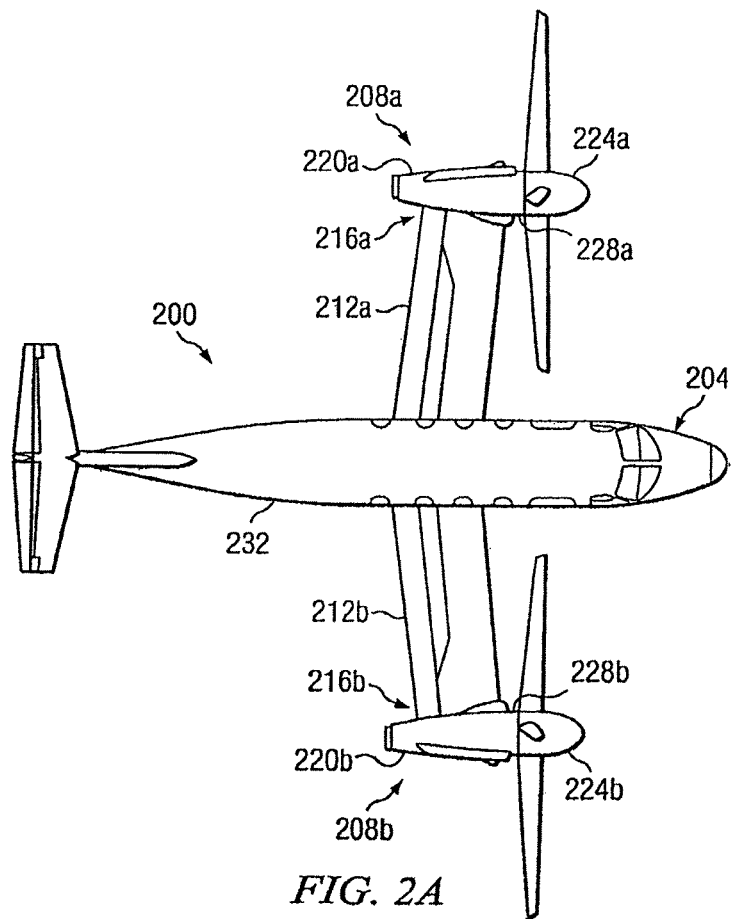
FIGS. 2A and 2B illustrate one embodiment of another system that includes one or more trunnions that provide for collective control.
Figure 2B:
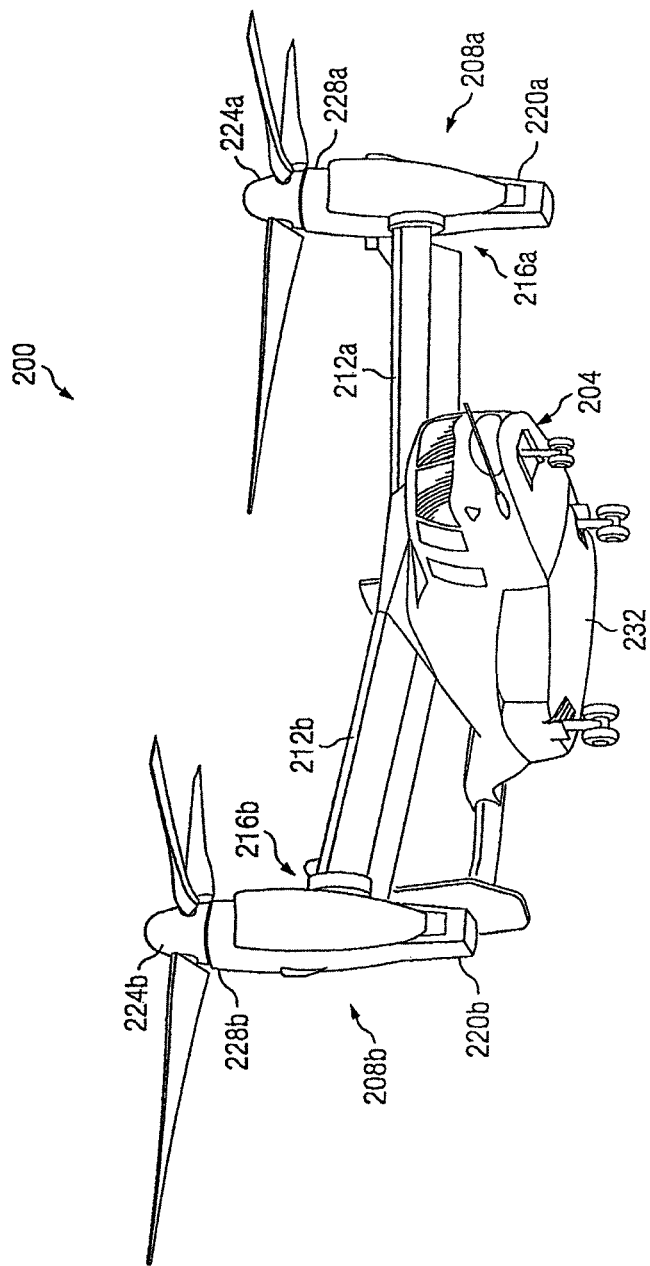

FIGS. 2A and 2B illustrate one embodiment of another system 200 that includes one or more trunnions that provide for collective control. According to the illustrated embodiment, system 200 is a tilt rotor aircraft 204. Tilt rotor aircraft 204 may include rotor assemblies 208a and 208b carried by wings 212a and 212b and positioned on the left side of tilt rotor aircraft 204 and the right side of tilt rotor aircraft 204, respectively. Rotor assemblies 208a and 208b may be disposed at end portions 216a and 216b of wings 212a and 212b, respectively. Tilt rotor assemblies 208a and 208b may include nacelles 220a and 220b, which carry the engines and transmissions of tilt rotor aircraft 204, as well as, rotor hubs 224a and 224b on forward ends 228a and 228b of tilt rotor assemblies 208a and 208b, respectively.

Tilt rotor assemblies 208a and 208b may rotate (or otherwise move) relative to wings 212a and 212b between a helicopter mode in which tilt rotor assemblies 208a and 208b are tilted upward such that tilt rotor aircraft 204 flies like a conventional helicopter (as is illustrated in FIG. 2B); and an airplane mode in which tilt rotor assemblies 208a and 208b are tilted forward, such that tilt rotor aircraft 204 flies like a conventional propeller driven aircraft (as is illustrated in FIG. 2A). Tilt rotor aircraft 204 may further include fuselage 232, coupled to wings 212a and 212b. In particular embodiments, tilt rotor aircraft 204 may include one or more trunnions that slide up and down one or more drive tubes (not shown) of tilt rotor aircraft 204 to provide for collective control of tilt rotor aircraft 204.

Although FIGS. 2A and 2B illustrate the tilt rotor aircraft 204 as including only two tilt rotor assemblies 208a and 208b. In particular embodiments, tilt rotor aircraft 204 may include any suitable number of tilt rotor assemblies 208. For example, tilt rotor aircraft 204 may include four tilt rotor assemblies 208.

Although FIGS. 1, 2A, and 2B illustrate helicopter 14 and tilt rotor aircraft 204 as particular examples of systems that include one or more trunnions that provide for collective control, trunnions may be utilized in any other system that includes collective control, such as any other type of aircraft (such as an airplane). Furthermore, trunnions may also be used in other systems, such as automotive systems, machinery systems, or plumbing systems.

Traditionally, various trunnion assemblies have been utilized to provide for collective control in aircraft, such as the aircraft disclosed above with regard to FIGS. 1, 2A, and 2B. Unfortunately, such prior art trunnion assemblies have various disadvantages. For example, a traditional trunnion assembly includes four separate parts: a trunnion, an insert, a locking plate, and fasteners. In such an assembly, the insert and/or locking plate are inserted into the trunnion, fastened together using the fasteners, and this entire trunnion assembly is connected around the drive tube of the aircraft. That is, the trunnion is not in direct contact with the drive tube, but is, instead, indirectly attached to the drive tube using the insert and/or locking plate. Such a traditional trunnion assembly, however, requires at least four separate parts for each drive tube of an aircraft, all of which may be expensive and tend to break and/or wear down at different rates. Furthermore, in aircraft that include a drive tube positioned on the left side of the aircraft and a drive tube positioned on the right side of the aircraft (such as tilt rotor aircraft 204 of FIGS. 2A and 2B), a different trunnion assembly may be used for each drive tube. In particular, because of different configurations of the rotor assemblies on each side of the aircraft (such as rotor assemblies 208a and 208b of FIGS. 2A and 2B, which each include a drive tube) each rotor assembly has traditionally utilized a completely different insert for each rotor assembly, thereby requiring more parts for the aircraft. In particular embodiments, such disadvantages may be addressed in this disclosure.

Figure 3:
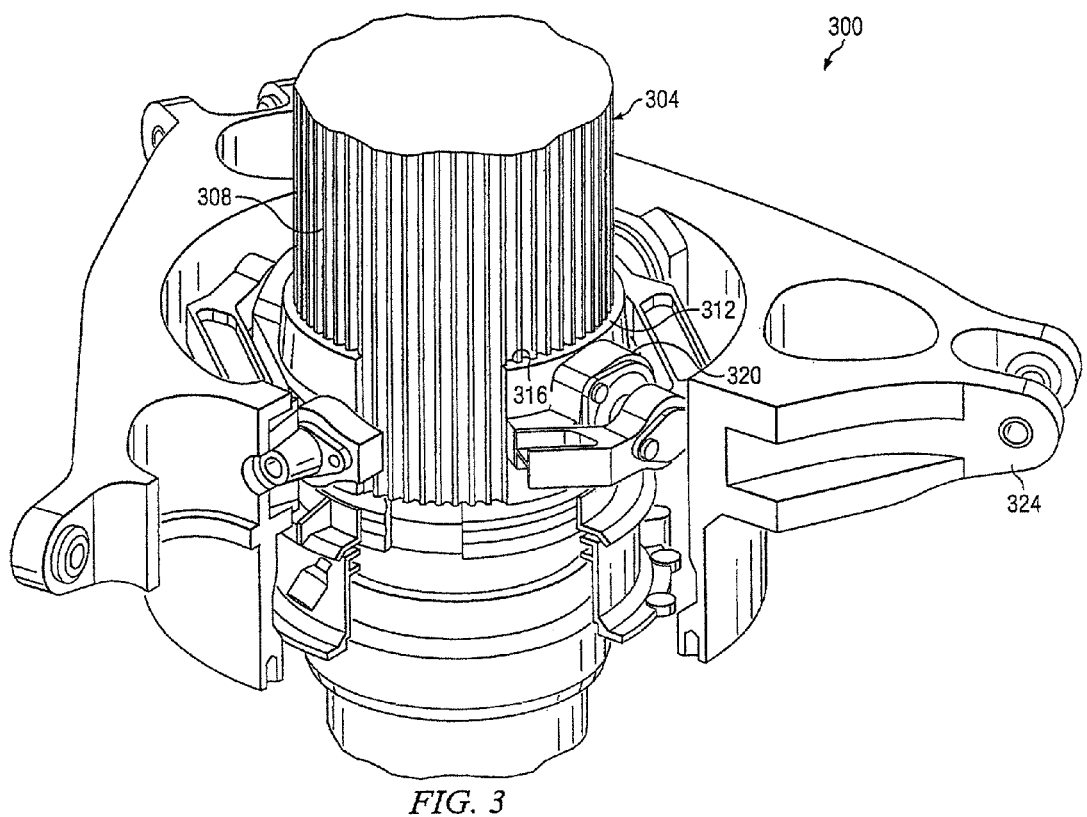
FIG. 3 illustrates one embodiment of a trunnion configuration that may be utilized for providing for collective control in an aircraft.

FIG. 3 illustrates one embodiment of a trunnion configuration 300 that may be utilized for providing for collective control in an aircraft. According to the illustrated embodiment, trunnion configuration 300 includes a trunnion 312 that is connected directly to drive tube 304. In particular embodiments, such a direct connection of the trunnion 312 to drive tube 304 may prevent one or more disadvantages associated with prior trunnion assemblies.

According to the illustrated embodiment, trunnion configuration 300 includes drive tube 304, trunnion 312, and swash plate 324. Drive tube 304 may rotate around a longitudinal axes, and may transfer torque to trunnion 312 and swash plate 324. This transferred torque may cause both trunnion 312 and swash plate 324 (or a portion of swash plate 324) to also rotate around the longitudinal axes, thereby allowing swash plate 324 to control the pitch of the aircraft rotor blades while they rotate. Drive tube 304 may include a plurality of splines 308 that transfer torque from drive tube 304 to trunnion 312 and swash plate 324. Additionally, splines 308 may further allow trunnion 312 to slide up and down drive tube 304 in order to provide for collective control. Splines 308 of drive tube 304 may be ridges and/or teeth of drive tube 304 that may interface with corresponding splines (not shown) of trunnion 312. Splines 308 may be any suitable type of spline. For example, splines 308 may be parallel key splines, involute splines, crowned splines, serratesions, helical splines, ball splines, or any other type of spline. In particular embodiments, drive tube 304 may include splines 308 externally (as is shown in FIG. 3) and also internally (such as at the top of the mast of drive tube 304). Additional details regarding splines 308 are discussed below with regard to FIGS. 4A-4C.

Drive tube 304 may have any suitable shape and/or size. For example, drive tube 304 may be a hollow cylinder having any suitable diameter. Drive tube 304 may be made of any suitable material. For example, drive tube 304 may be made of aluminum, aluminum alloys, titanium, titanium alloys, carbon steel, blue-tempered carbon steel, stainless steel, nickel based alloys, any other metal, or any combination of the preceding. In addition to being made of any suitable material, drive tube 304 may further include a coating (not shown). For example, drive tube 304 may be coated with Keronite® (such as Keronite® B0 or Keronite® P050), Keronite® with a solid film lubricant or other suitable friction modifier (such as Keronite® B0 with a solid film lubricant or Keronite® P050 with a solid film lubricant), Tufram®, hard anodize with Teflon®, Karon® V, any other suitable coating, or any combination of the preceding. In particular embodiments, the coating of drive tube 304 may create a wear and/or tear mark as the drive tube 304 is used over time. Such a wear and/or tear mark on drive tube 304 may allow drive tube 304 to be visually inspected by a user without disassembling trunnion configuration 300. As such, the coating may provide for easier maintenance of drive tube 304 and trunnion configuration 300. In particular embodiments, the coating of drive tube 304 may further provide better wear and/or tear resistance. For example, the coating of drive tube 304 may allow the drive tube 304 to be used for, for example, 10,000 cycles (as opposed to the 7,500 cycles that previous drive tubes were traditionally restricted to). As a further example, the coating may further prevent drive tube 304 from having to be lubricated on a periodic basis. In particular embodiments, once the wear and/or tear mark of the coating of drive tube 304 reaches a pre-determined status, drive tube 304 may then be replaced.

Trunnion 312 provides for collective control of an aircraft. For example, trunnion 312 may slide up and down axially on drive tube 304, which may cause swash plate 324 to also move up and down, controlling the pitch of the aircraft's rotor blades. According to the illustrated embodiment, trunnion 312 includes a first portion 316 and a second portion 320. The first portion 316 may be in direct contact with drive tube 304. For example, first portion 316 may be an internal portion of trunnion 312 and may include a plurality of splines (not shown) that may interface with splines 308 of drive tube 304. In particular embodiments, the splines of first portion 316 may match (i.e., mesh together with) splines 308 of drive tube 304, allowing trunnion 312 (and first portion 316) to be in direct contact with drive tube 304. In particular embodiments, direct contact may refer to a configuration where no substantive material (such as a metal insert and/or locking plate) is in-between first portion 316 and drive tube 308. As such, trunnion 312 (and first portion 316) may be in direct contact (or directly connected to) drive tube 304 even if a non-substantive material (such as a lubricant) is in-between first portion 316 and drive tube 304.

Second portion 320 may connect trunnion 312 to swash plate 324. In particular embodiments, by connecting trunnion 312 to swash plate 324, second portion 320 may cause swash plate 324 to move up and down axially on drive tube 304 with trunnion 312. As such, collective control may be provided to the aircraft. Furthermore, by second portion 320 connecting trunnion 312 to swash plate 324, swash plate 324 may also be connected to drive tube 304 so that torque from drive tube 304 may cause swash plate 324 (or a portion of swash plate 324) to rotate. Second portion 320 may connect to swash plate 324 in any suitable manner. For example, second portion 320 may connect to a gimble drive ring assembly, which is connected to swash plate 324. Such a gimble drive ring assembly may allow swash plate 324 to tilt on its axes in order to provide cyclic control for the aircraft.

Trunnion 312 may be made of any suitable material. For example, trunnion 312 may be made of aluminum, aluminum alloys, titanium, titanium alloys, carbon steel, blue-tempered carbon steel, stainless steel, nickel based alloys, any other metal, or any combination of the preceding. In addition to being made of any suitable material, trunnion 312 may further include a coating (not shown). For example, similar to drive tube 304, trunnion 312 (such as first portion 316 of trunnion 312) may be coated with Keronite® (such as Keronite® B0 or Keronite® P050), Keronite® with a solid film lubricant or other suitable friction modifier (such as Keronite® B0 with a solid film lubricant or Keronite® P050 with a solid film lubricant), Tufram®, hard anodize with Teflon®, Karon® V, any other suitable coating, or any combination of the preceding. In particular embodiments, the coating of trunnion 312 may create a wear and/or tear mark as the trunnion 312 is used over time. Such a wear and/or tear mark on trunnion 312 may allow trunnion 312 to be visually inspected by a user without disassembling trunnion configuration 300. As such, the coating may provide for easier maintenance of trunnion 312 and trunnion configuration 300. In particular embodiments, the coating of trunnion 312 may further provide better wear and/or tear resistance. For example, the coating of trunnion 312 may allow the trunnion 312 to be used for, for example, 10,000 cycles (as opposed to the 7,500 cycles that previous trunnions were traditionally restricted to). As a further example, the coating may further prevent trunnion 312 from having to be lubricated on a periodic basis. In particular embodiments, once the wear and/or tear mark of the coating of trunnion 312 reaches a pre-determined status, trunnion 312 may then be replaced.

Swash plate 324 may control the pitch of the aircraft's rotor blades. For example, swash plate 324 may move up and down drive tube 304 with trunnion 312, thereby changing the pitch of each of the aircraft's rotor blades simultaneously. As is discussed above, such a simultaneous change of the aircrafts rotor blades may be referred to as collective control, and may cause the aircraft to increase and/or decrease its altitude. Furthermore, swash plate 324 may tilt up and down with respect to other portions of swash plate 324. Such tilting may cause the pitch of one of the aircraft's rotor blades to be changed individually. Such an individual change of the pitch of a rotor blade may be referred to as cyclic control, and may cause the aircraft to move forward, backward, left, right, or any combination of the preceding. Swash plate 324 may be made of any suitable material. For example, trunnion 312 may be made of aluminum, aluminum alloys, titanium, titanium alloys, carbon steel, blue-tempered carbon steel, stainless steel, nickel based alloys, any other metal, or any combination of the preceding.

Modifications, additions, or omissions may be made to the trunnion configuration 300 without departing from the scope of the invention. The components of the trunnion configuration 300 may be integrated or separated. Moreover, the operations of the trunnion configuration 300 may be performed by more, fewer, or other components. For example, the operations of swash plate 324 may be performed by more than one component.

Figure 4A:
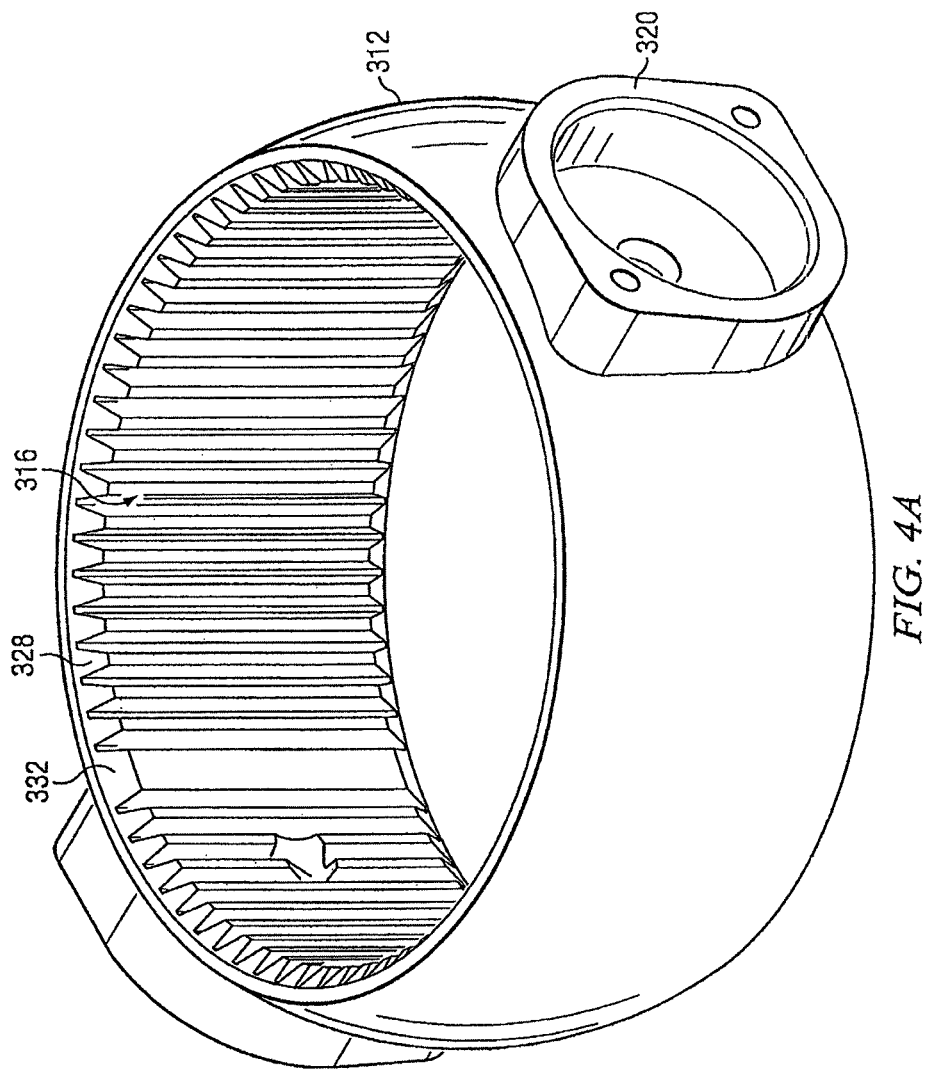
FIGS. 4A-4C illustrate various views of one embodiment of a trunnion.
Figure 4B:
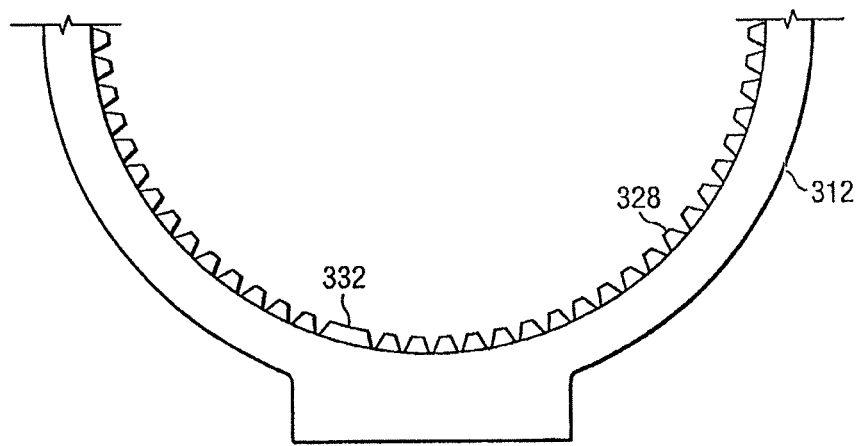
Figure 4C:
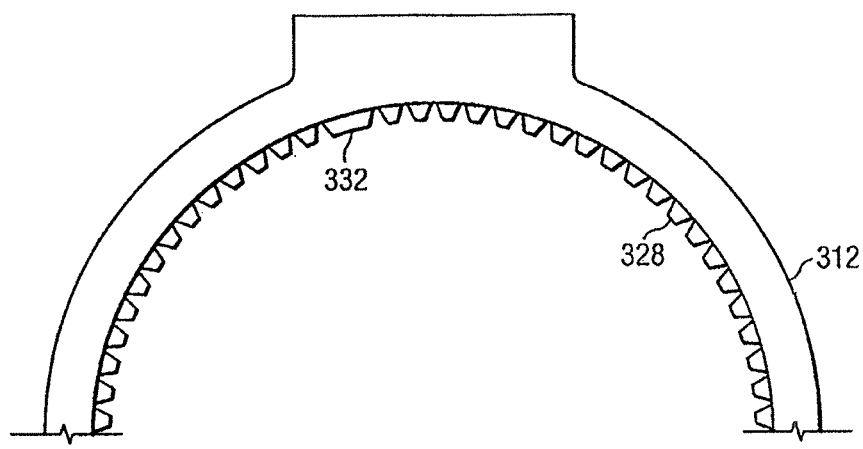

FIGS. 4A-4C illustrate various views of one embodiment of a trunnion 312. According to the illustrated embodiment, trunnion 312 includes first portion 316, second portion 320, and splines 328. As is discussed above, first portion 316 may be in direct contact with drive tube 304, and second portion 320 may connect trunnion 312 to swash plate 324.

Splines 328 of trunnion 312 may interface with splines 308 of drive tube 304, thereby allowing torque to be transferred from drive tube 304 to trunnion 312 and swash plate 324. Splines 328 may be any suitable type of spline that meshes with splines 308 of drive tube 304. As one example, both splines 328 and 308 may be crowned splines. Splines 328 may have any suitable dimensions. Furthermore, the dimensions of splines 328 may vary based on their application.

FIG. 4B illustrates a right side up view of trunnion 312, and FIG. 4C illustrates a left side up view of trunnion 312. As is discussed above, various aircraft (such as tilt rotor aircraft 204 of FIGS. 2A and 2B) may include one or more drive tubes on the right side of the aircraft and one or more drive tubes on the left side of the aircraft. Because drive tubes on the right side of the aircraft have a different orientation than drive tubes on the left side of an aircraft, traditional trunnion assemblies use different parts for each drive tube. For example, a first insert of the traditional trunnion assembly is used for the right side drive tube, and a second completely different insert of the traditional trunnion assembly is used for the left side drive tube. Because a different part is used for each side of the aircraft, a user typically orders two different parts for each aircraft, and those parts are not interchangeable. As such, if an insert for the left side of the aircraft fails, and the user only had a spare right side insert (and not a spare left side insert), the aircraft may be unusable until the new left side insert can be ordered and delivered.

Such disadvantages of the traditional trunnion assemblies, however, may be addressed by trunnion 312, as illustrated in FIGS. 4B and 4C. For example, according to the illustrated embodiment, trunnion 312 includes a right side up orientation (FIG. 4B) and a left side up orientation (FIG. 4C). In particular embodiments, due to the configuration of splines 328 of trunnion 312, trunnion 312 may be oriented with the right side up in order to be utilized with a drive tube 304 positioned on the right side of an aircraft, and may further be oriented with the left side up in order be used with the drive tube 304 positioned on the left side of the aircraft. In particular embodiments, in order to assist in orienting trunnion 312 on a drive tube 304 positioned on either the right side of an aircraft or the left side of an aircraft, splines 328 may include a master tooth 332. Master tooth 332 may correspond to a matching master tooth in drive tube 304. Therefore, in particular embodiments, the master tooth 332 may be interfaced (or meshed) with the master tooth of the drive tube 304 when the trunnion 312 is connected to the drive tube 304. Furthermore, when the trunnion 312 is oriented with the right side up, the master tooth 332 may mesh with the master tooth of the drive tube 304 positioned on the right side. Similarly, when the trunnion 312 is oriented with the left side up, the master tooth 332 may mesh with the master tooth of the drive tube 304 positioned on the left side.

In particular embodiments, the right side up orientation (FIG. 4B) and the left side up configuration (FIG. 4C) of trunnion 312 may allow the same trunnion 312 to be used interchangeably on drive tubes 304 positioned on the left side of an aircraft and drive tubes 304 positioned on a right side of an aircraft. As such, instead of using two completely different parts, the same type of trunnion 312 may be used on the right side of the aircraft and the left side of the aircraft. Therefore in particular embodiments, two substantially identical trunnions 312 (i.e., where substantially identical refers to trunnions manufactured to the same design specification, and therefore being identical within standard manufacturing tolerances) may be purchased and/or manufactured, and either of the two trunnions 312 may be utilized with drive tubes 304 on the right side of the aircraft or the left side of the aircraft. As such, only a single type of trunnion 312 may be manufactured and/or purchased, but that single type of trunnion 312 may be utilized on drive tubes 304 on either side of the aircraft. In particular embodiments, this may allow for easier maintenance and lower procurement costs.

Modifications, additions, or omissions may be made to trunnion 312 without departing from the scope of the invention. The components of the trunnion 312 may be integrated or separated. Moreover, the operations of the trunnion 312 may be performed by more, fewer, or other components. For example, the operations of master tooth 332 may be performed by more than one component.

Although FIGS. 1-4C have been described above as including particular components, the systems of FIGS. 1-4C may include any combination of any of the described components and any of the options, or features described herein, as would be understood by one of ordinary skill in the art based upon the teachings of the disclosure. For example, any of the options or features described herein may be utilized in combination with the illustrated embodiments of FIGS. 1-4C and/or any number of the other options or features also described herein, as would be understood by one of ordinary skill in the art based upon the teachings of the disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A trunnion, comprising:
    a first portion operable to couple directly to a drive tube of an aircraft, wherein the drive tube is operable to rotate around a first axis, the drive tube comprising:
        a top end;
        a bottom end opposed to the top end;
        a cylindrical body having a side surface interposed between the top end and the bottom end; and
    a second portion operable to couple to a swash plate of the aircraft, wherein the swash plate is operable to cause a pitch of at least one of a plurality of aircraft blades to change;
    wherein the first portion is operable to couple directly to the side surface of the cylindrical body of the drive tube without mounting to the top end or the bottom end of the drive tube;
    wherein the trunnion is operable to simultaneously change the pitch of the plurality of aircraft blades by sliding along the first axis of the drive tube of the aircraft;
    wherein the swashplate is operable to slide along the first axis of the drive tube with the trunnion.

2. The trunnion of claim 1, wherein the first portion comprises a coating that visually indicates a wearing of the first portion.

3. The trunnion of claim 2, wherein the coating is selected from a group consisting of:
    a ceramic coating;
    an anodized coating; and
    a combination of the ceramic coating and the anodized coating.

4. The trunnion of claim 1, wherein the trunnion is operable to be used interchangeably on a right side of the aircraft or a left side of the aircraft.

5. The trunnion of claim 1, wherein the first portion comprises a plurality of first splines operable to interface with a plurality of second splines of the drive tube.

6. The trunnion of claim 1, wherein the drive tube is operable to transfer torque to the trunnion and at least a portion of the swash plate.

7. The trunnion of claim 1, wherein the aircraft is selected from a group consisting of:
    a helicopter; and
    a tilt-rotor aircraft.

8. A method, comprising:
    coupling a first portion of a trunnion directly to a drive tube of an aircraft, wherein the drive tube is operable to rotate around a first axis, the drive tube comprising:
        a top end;
        a bottom end opposed to the top end;
        a cylindrical body having a side surface interposed between the top end and the bottom end; and
    coupling a second portion of the trunnion to a swash plate of the aircraft, wherein the swash plate is operable to cause a pitch of at least one of a plurality of aircraft blades to change;
    wherein the first portion is operable to couple directly to the side surface of the cylindrical body of the drive tube without mounting to the top end or the bottom end of the drive tube;
    wherein the trunnion is operable to simultaneously change the pitch of the plurality of aircraft blades by sliding along the first axis of the drive tube of the aircraft;
    wherein the swashplate is operable to slide along the first axis of the drive tube with the trunnion.

9. The method of claim 8, wherein the first portion of the trunnion comprises a coating that visually indicates a wearing of the first portion.

10. The method of claim 9, wherein the coating is selected from a group consisting of:
    a ceramic coating;
    an anodized coating; and
    a combination of the ceramic coating and the anodized coating.

11. The method of claim 8, wherein the trunnion is operable to be used interchangeably on a right side of the aircraft or a left side of the aircraft.

12. The method of claim 8, wherein the first portion of the trunnion comprises a plurality of first splines operable to interface with a plurality of second splines of the drive tube.

13. The method of claim 8, wherein the drive tube is operable to transfer torque to the trunnion and at least a portion of the swash plate.

14. The method of claim 8, wherein the aircraft is selected from a group consisting of:
   a helicopter; and
   a tilt-rotor aircraft.

15. The trunnion of claim 4, wherein the trunnion is operable to be used interchangeably on the right side of the aircraft or the left side of the aircraft by having a first orientation corresponding to the left side and a second orientation corresponding to the right side.

16. The trunnion of claim 5, wherein the trunnion comprises a first master tooth on an inner surface of the trunnion, the first master tooth being distinct from the first splines, the first master tooth positioned between two of the first splines, the master tooth operable to interface with a second master tooth of the drive tube.

* * * * *